United States Patent

Ekstrom

[15] 3,641,356
[45] Feb. 8, 1972

[54] STATIC CONVERTER STATION FOR HIGH VOLTAGE

[72] Inventor: Ake Ekstrom, Ludvika, Sweden

[73] Assignee: Allmanna Svenska Elektriska Aktiebolaget, Vasteras, Sweden

[22] Filed: Feb. 16, 1971

[21] Appl. No.: 115,292

[30] Foreign Application Priority Data

Feb. 19, 1970 Sweden..................................2089/70

[52] U.S. Cl...................................307/64, 307/82, 307/84, 321/27 R, 321/38
[51] Int. Cl...............................................H02j, H02m 1/02
[58] Field of Search..................321/27 R, 38, 40, 11; 307/45, 307/64, 65, 82, 85, 23

[56] References Cited

UNITED STATES PATENTS

| | | | |
|---|---|---|---|
| 2,532,108 | 11/1950 | Lamm | 321/11 |
| 3,530,362 | 9/1970 | Filimonov et al. | 321/27 R |
| 3,586,960 | 6/1971 | Hingorani | 321/38 |

FOREIGN PATENTS OR APPLICATIONS

| | | | |
|---|---|---|---|
| 1,078,336 | 8/1967 | Great Britain | 321/27 |
| 1,204,319 | 11/1965 | Germany | 321/27 |

*Primary Examiner*—William H. Beha, Jr.
*Attorney*—Jennings Bailey, Jr.

[57] ABSTRACT

A converter station for high voltage is formed of a plurality of static converters with a direct current side directed in series. Each converter is a full-wave rectifier bridge provided with a control device. An additional control device is provided with a reserve control for one of the converters, which controls two series-connected rectifier groups of the bridge with different delay angles, one greater and the other less than 90°. As a result the two series rectifiers in one phase of the bridge conduct simultaneously and current is commutated at a certain frequency from the rectifier in one phase of the rectifier bridge to the rectifier in a subsequent phase of the bridge.

10 Claims, 4 Drawing Figures ations in the rectifier bridge during reserve operation, and thus the number of unavoidable disturbances caused. How low the frequency should be and may be is determined by the length of the operating periods which can be permitted in each pair of rectifiers, which is in turn determined by the heat capacity of the rectifiers.

3,641,356

1
STATIC CONVERTER STATION FOR HIGH VOLTAGE

BACKGROUND OF THE INVENTION

1. Field of the Invention

The present invention relates to a converter station for high voltage, comprising a plurality of static converters having their direct current sides connected in series and each consisting of a full-wave rectifier bridge with control devices.

2. The Prior Art

When building static converter stations it is normal to provide with reserve rectifiers, since the rectifiers in a converter station are one of the more sensitive components which must have periodic supervision and even if there is a fault in one rectifier, the station must be able to operate. There may therefore be a rectifier in reserve or a rectifier group, that is an entire rectifier bridge with a complete set of rectifiers, or even an entire supplemental converter with rectifier groups, converter-transformers and a control system. The present invention relates principally to such a reserve converter.

A complete new reserve converter increases the costs of the plant but, on the other hand, involves the least number of reconnections when the reserve is to be brought into use. However, in order to achieve the quickest possible connection of the reserve converter, this should be operating continuously in neutral or reserve position which, for a converter, may comprise controlling its rectifiers with a delay angle of 90°, the direct voltage of the converter thus being zero. This means that the rectifiers are kept at operating temperature and that the converter is always in working condition. On the other hand, the delay angle of 90° causes a high consumption of reactive power and considerable wear of the rectifiers due to the combination of high commutation current and commutation voltage. For this reason this type of control is not suitable for reserve operation.

SUMMARY OF THE INVENTION

Instead it is proposed according to the invention to arrange a special control device for reserve control so that two series-connected rectifiers in one phase of the rectifier bridge are always conducting at the same time and, furthermore, that the current is always commutated from the rectifiers in one phase of the rectifier bridge to a subsequent phase in this bridge at a certain frequency.

In this way, the rectifier bridge can be permanently connected in series with the other converters in the station. The corresponding converter-transformer will be substantially currentless and, since the current commutates from phase to phase in the rectifier bridge, the load will be evenly distributed between the rectifiers. The converter is thus ready to be switched in even during temporary disturbances. The frequency at which the current commutates from phase to phase must be determined by the heat capacity of the rectifiers, but usually it may be taken somewhat lower than the normal operating frequency of the rectifiers, as long as the rectifiers do not have an extremely low heat capacity.

The principle of the invention, as previously mentioned, is meant principally for reserve operation of a reserve converter, but is can also be used with advantage during the short neutral periods during connection and disconnection or if a converter is temporarily blocked, where previously the delay angle was decreased to 90°, or upon deblocking of a bypass valve or a permanent bypass path consisting of two opposing rectifiers.

BRIEF DESCRIPTION OF THE DRAWINGS

The invention will be further described with reference to the accompanying drawings in which FIG. 1 shows a converter station with a reserve converter according to the invention, whereas

2

DESCRIPTION OF THE PREFERRED EMBODIMENTS

Figure 1:
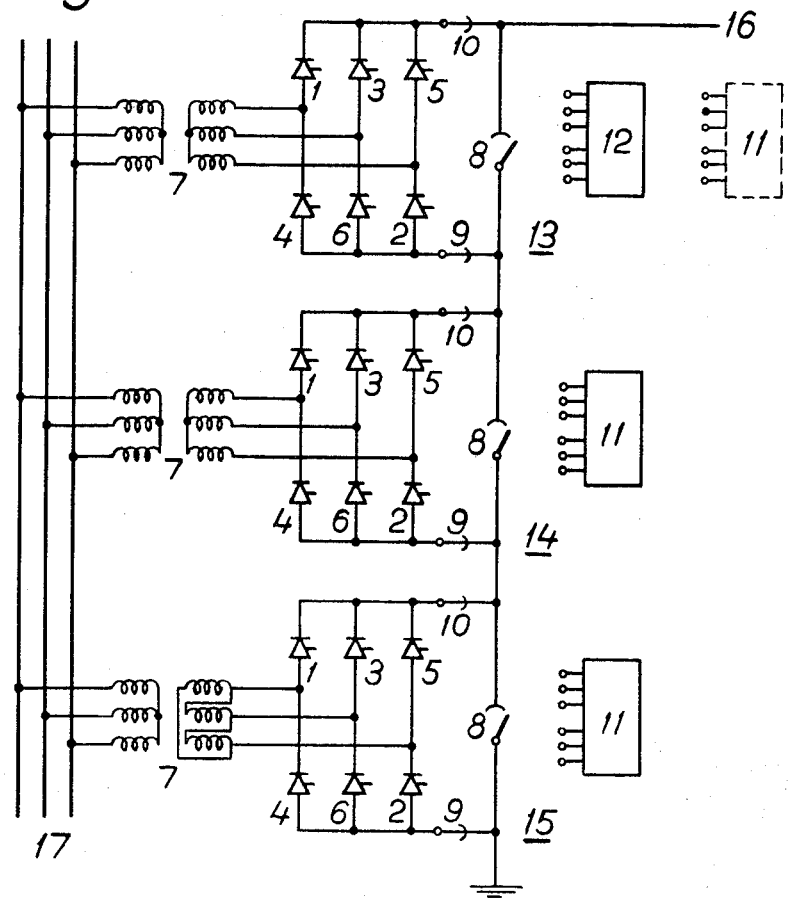

FIG. 1 shows a converter station comprising three converters 13, 14 and 15, the DC sides of which are connected in series between a DC conductor 16 and earth, whereas their AC sides are connected in parallel to a common AC network 17.

Each converter comprises a three-phase rectifier bridge having six rectifiers 1–6 connected to the AC network by way of a converter-transformer 7. The DC side of each converter is connected in parallel with a bypass member in the form of an isolator 8 and the converter can be disconnected on the DC side by means of isolators 9 and 10. The rectifiers in the converters 14 and 15 are controlled during normal operation by the control device 11 with a certain delay angle, for example as stated in U.S. Pat. No. 3,551,778. The converter 13, however, is meant to be a reserve converter which is provided with a control device 12 for reserve operation, which means that at one moment the rectifiers 1 and 4 are conducting and current carrying and after that the current commutates to the rectifiers 3 and 6 and then to 5 and 2, and so on. The converter 13 should also be provided with a normal control device 11 which is connected in when the converter is to come into active operation instead of one of the converters 14 or 15. An additional control device 12 is even possible for temporary control of the converter which is being connected or disconnected.

Figure 2:
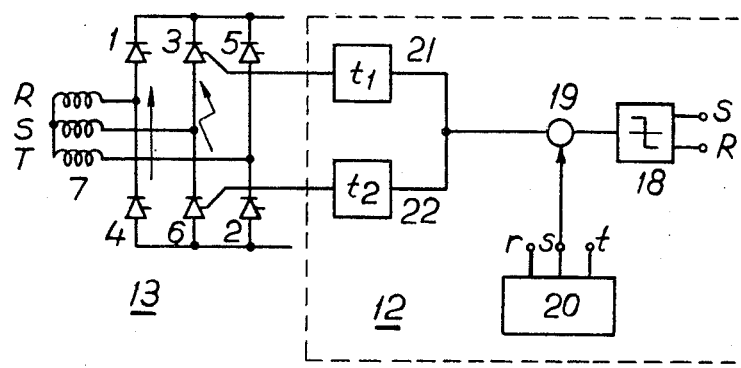
FIG. 2 shows a control device for reserve control of such a converter.

The design of the control device 12 is seen more clearly in FIG. 2 which shows a part of the converter 13 with the reserve control device 12. In order to make the current in, for example the rectifiers 1,4, connected to the transformer phase R, commutate over to the rectifiers 3,6, connected to phase S, there must be a commutation voltage and, since this can only be taken from the transformer phases R and S, it is obvious that the commutation must take place in two stages, different polarity of the commutating voltage being necessary for commutation from 1 to 3 and from 4 to 6. Furthermore, the two commutation stages must be carried out with as little gap as possible in order to get the least possible current in the transformer 7 and thus the least possible disturbances in the network 17 resulting from the reserve operation.

The intention is that the reserve converter should behave as if it were completely bypassed seen both from the DC and the AC sides. This means that the two stages in the commutation should take place respectively just before or just after the passage of the commutation voltage through zero, as will be further described in connection with FIG. 3.

The input to the control device 12 is represented for the rectifiers 3 and 6 by a discriminator 18 connected to the phases R and S on the transformer 7 and by the phases on a three-phase control pulse generator 20 having the phases $r,s,t$ corresponding to the rectifier phases 1,4; 3,6; 5,2, respectively.

Figure 3:
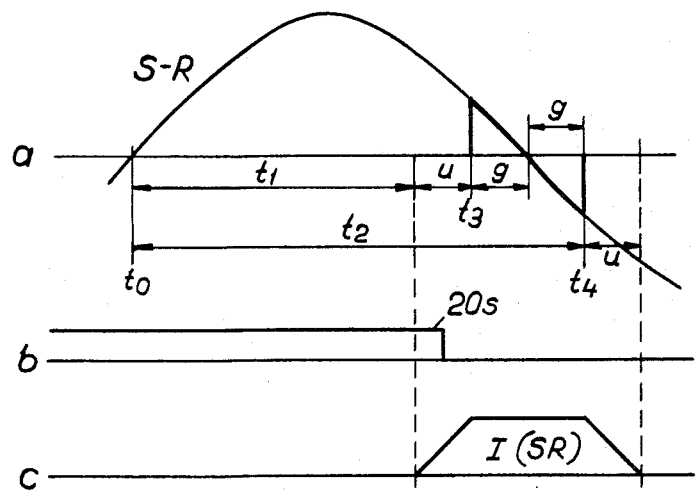
FIG. 3 shows voltage curves for such a control device and FIG. 4 shows a further development of FIG. 1.

The discriminator 18 emits a signal every time the main voltage S–R passes zero and becomes positive. For this purpose the discriminator may be designed as a pulse transformer or a monostable circuit. Said signal is fed over a switching member, for example an electronic relay 19, to two delay devices 21 and 22 having delay times $t_1$ and $t_2$ which are shown in FIG. 3. The control pulse generator 20 which controls 19 emits pulses lasting approximately as long as the period for the network 17 so that during each pulse a signal is achieved form the discriminator 18 through the switching device 19.

The frequency of the control pulse generator 20 should be lower than of the network 17 to limit the number of commutations in the rectifier bridge during reserve operation, and thus the number of unavoidable disturbances caused. How low the frequency should be and may be is determined by the length of the operating periods which can be permitted in each pair of rectifiers, which is in turn determined by the heat capacity of the rectifiers.

FIG. 3a shows the commutation voltage S–R and it can be seen that this must be positive in order for current to be able to commutate from rectifier 1 to rectifier 3, whereas it must be negative if current is to commutate from rectifier 4 to rectifier 6. At the moment $t_o$ when S–R becomes positive the discriminator 18 emits a signal and, if the member 19 is simultaneously kept conducting by a control pulse 20s from the generator 20, see FIG. 3b, this signal is fed to the delay members 21 and 22 which, after intervals of $t_1$ and $t_2$, respectively, emit control pulses to the rectifiers 3 and 6, respectively.

The length of the times $t_1$ and $t_2$ is clear from FIG. 3a. At the end of the time $t_1$ the rectifier 3 is ignited and, during the interval $u$ up to the moment $t_3$, the direct current commutates from 1 to 3. After that, a certain time $g$ is required for the rectifier 1 to recover before the commutation voltage changes polarity. It can be seen that this commutation corresponds to inverter operation so that the time $u+g$, which should be as short as possible, can suitably be determined by a control device commutation margin control, for example according to U.S. Pat. No. 2,774,012. $t_1$ then becomes $= 180°-(u+g)$. The time $t_2$ should be $= 180°+g$ so that the alternating voltage pulse which is shown in FIG. 3a by a thicker line from $t_3$ to $t_4$, and which appears on the DC side of the converter 13, will be symmetrical and thus a pure alternating voltage.

FIG. 3c shows the current pulse I (SR) which arises in the transformer 17 during the commutation, that is, from the start to the commutation from 1 to 3 and to the end of the commutation from 4 to 6.

The process shown is inverter control for the commutating group 1, 3, 5 and rectifier control for the group 2, 4, 6. If the commutation had been placed at the left-hand zero-passage of the curve S–R in FIG. 3a, the situation would have been the reverse, which would mean that the discriminator 18 in FIG. 2 would alter polarity and the times $t_1$ and $t_2$ be exchanged.

The control device 12 in FIG. 2 may otherwise be considered as a purely symbolical diagram to illustrate the principle of reverse control. As mentioned previously, such a control device may also be used when a converter is started, before being connected. During transition from reserve control to normal operation, a normal control device 11 is simply connected in parallel with the control device 12, after which the control pulse generator 20 is disconnected so that the signals from 18 disappear and the ordinary control device takes over.

Starting a converter means in the first place that the converter is bypassed because the corresponding bypass member 8 is closed. Formerly, the converter was started by opening the bypass member at the same time that a separate bypass valve, or two operating rectifiers connected in series, received control pulses. In this way an arc voltage drop arose over the bypass member, which was utilized to ignite the rectifiers. The arc arising is, however, a heavy load on the bypass member, particularly as the arc voltage drop is often the absolute minimum for a rapid and certain ignition of the rectifiers.

Instead, before the bypass member is opened, the rectifiers can be ignited with the help of the extra control device 12 according to FIG. 2 so that the transformer voltage is sued to ignite the rectifiers. The current pulse shown in FIG. 3c will then follow the current path of least resistance—that is to say through the corresponding bypass member. By designing the delay members 21 and 22 with variable delay times in such a way that the time $t_1$ is shortened and the time $t_2$ lengthened, the current pulse according to FIG. 3c can be extended and acquires greater amplitude. This means that the amplitude at a certain moment exceeds the load current of the converter. This in turn means that the current through the bypass member acquires zero-passages which can be used to open the bypass member which can then be designed as a breaker.

The method is suitable for automization since the opening of the bypass member takes place depending on the current in this member.

Furthermore, the frequency of the control pulse generator 20, which may be variable, should be set at the frequency of the network 17 during reconnection of the converter so that the bypass member is more rapidly opened.

When the member 8 has been opened, the members 20, 21, 22 in the control member 12 can be decreased to their normal control frequency for reserve, or a normal control device 11 can be connected for normal operation of the converter.

In FIG. 1 the converter-transformers 7 for the active converters 14 and 25 are connected in Y/Y and Y/D connection, respectively, in order to achieve the pulse number 12 for these two converters, each of which has a pulse number of 6. This eliminates the lower harmonics, especially all fifth and seventh. If the reserve converter 13 takes over the load from 14, this does not change the pulse number, but, if it is 15 which is replaced by 13, the pulse number of the station drops to 6, whereupon the number of harmonics is doubled and fifth and seventh harmonics are added. This is a disadvantage of using a complete converter as reserve, since it is expensive to make the converter transformer switchable, and the relatively long time necessary for the switching counteracts the advantage of the rapidly connectable reserve converter.

Figure 4:
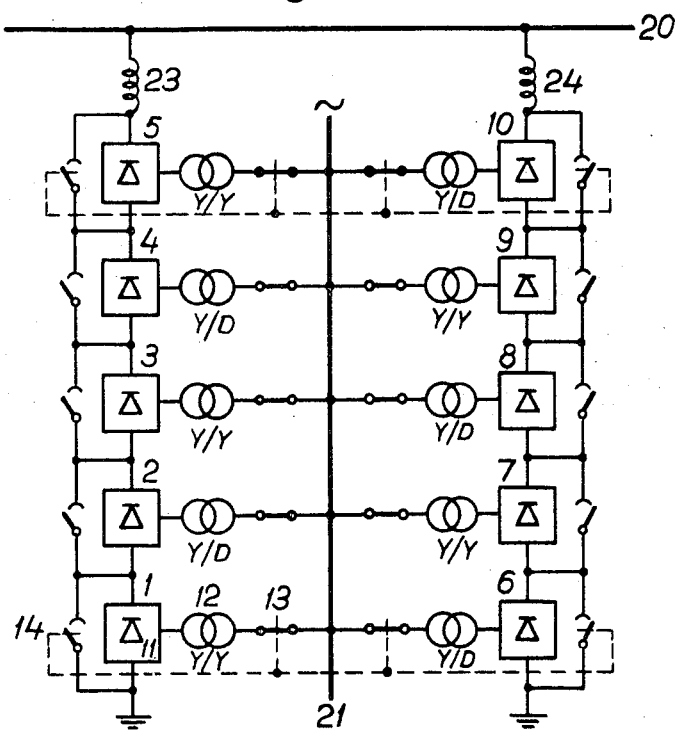

However, the use of complete reserve converters is mainly of interest for extremely large and important equipment where the requirements of reliability and continuous operation outweigh the consideration of equipment costs and in such equipment, therefore, a converter station in accordance with FIG. 4 may be used in which the complete reserve converters do not cause any problems with respect to pulse number and harmonics.

FIG. 4 shows a converter station comprising two parallel chains of converters 1–5 and 6–10, respectively, connected in series between a DC line 20 and earth. The AC sides of the converters are connected in parallel to an alternating current network 21. The two chains of rectifiers are connected to the DC line by way of smoothing reactors 23,24. In each chain it is presumed that only four converters, that is 1–4 or 6–9, respectively are active, while the converters 5 and 10 are in reserve, having reverse control in accordance with the invention. The voltage on the line 20 is thus four times the voltage through one converter, whereas the number of series-connected converters is five.

The converters in FIG. 4 have been shown purely symbolically as comprising a rectifier bridge 11, a converter-transformer 12, a breaker 13 for connection to the AC network 21 and a bypass isolator 14 on the DC side.

The converter-transformers 12 are connected in alternately Y/Y and Y/D connection in the two chains and also with different connections of the opposite converters of the two chains. Furthermore, the connection members 13 and 14 for converters in the same layer are connected so that each such pair of converters is connected or disconnected at the same time. This is advisable since connection or disconnection of a converter in one chain must entail the same precaution in the other chain so that the number of series-connected active converters and thus the direct voltage is always the same in both chains. Since the transformers in each pair of converters are connected differently, the resultant pulse number of one such pair will be 12 and connection and disconnection or a converter pair will not alter the pulse number of the station. Neither will connection or disconnection of the reserve converters, or rather, switching from reserve to active operation and vice versa, cause any alteration in the pulse number. There are therefore no operational disadvantages to the complete reserve converters in equipment of this type.

I claim:

1. Converter station for high voltage, comprising a plurality of static converters having their direct current sides connected in series and each comprising a full-wave rectifier bridge with control devices for each converter, in which for one of these converters an additional control device is provided for reserve control, said control device including means to control two series-connected rectifier groups of the rectifier bridge with different delay angles, one angle being greater and the other less than 90°, so that two series-connected rectifiers in one phase of the rectifier bridge are conducting simultaneously and that the current is commutated at a certain frequency from the rectifiers in one phase of the rectifier bridge to a subsequent phase of the bridge.

2. Converter station according to claim 1, including means operable upon commutation from one phase to another in the reserve converter for igniting one rectifier in the igniting phase just before zero-passage of the commutation voltage between the two phases and for igniting the other rectifier in this phase just after said passage through zero.

3. Converter station according to claim 1, including bypass members parallel-connected with the converters, in which in order to reconnect a bypassed converter, said additional control device includes means operable during reconnection of a bypassed converter to cause variable delay angles for the two series-connected rectifier groups in order to increase the current of the converter.

4. Converter station according to claim 1, including bypass members parallel-connected with the converters, means for measuring the current in a bypassed converter, and means responsive to said current to control the bypassed converter in dependence on the passage of the current through zero.

5. Converter station according to claim 1, in which the frequency of the control device for reserve control is lower than the frequency of the normally operating control devices.

6. Converter station according to claim 1, in which the frequency of the additional control device is variable.

7. Converter station according to claim 1, in which the number of normally operating converters corresponds to the rated direct voltage of the station, and an additional converter provides a reserve for the other converters.

8. Converter station according to claim 7, in which the converters are connected alternately for reserve control.

9. Converter station according to claim 7, comprising two parallel chains of series-connected converters, each containing one reserve converter, converter-transformers connected with phase positions differing from each other connecting said reserve converters to the AC line.

10. Converter station according to claim 9, in which the converter-transformers of the other converters are connected with differing phase positions, connecting members for converters in the two chains being connected in pairs so that, when a converter with a phase position in one chain of converters is disconnected, a corresponding converter with another phase position is disconnected in the other chain.

* * * * *